US005226327A

United States Patent [19]

Fassina

[11] Patent Number: 5,226,327

[45] Date of Patent: Jul. 13, 1993

[54] SCREWING DEVICE WITH MEANS FOR MEASURING THE TIGHTENING STRAIN IN A BOLT

[75] Inventor: Bruno Fassina, Piossasco, Italy

[73] Assignee: Fiat Auto SpA, Turin, Italy

[21] Appl. No.: 893,542

[22] Filed: Jun. 4, 1992

[30] Foreign Application Priority Data

Jun. 5, 1991 [IT] Italy .......................... TO91A000425

[51] Int. Cl.$^5$ .............................................. F16B 31/02

[52] U.S. Cl. .......................................... 73/761; 81/429

[58] Field of Search ...................... 73/761, 866.5, 597, 73/644, 627, 629, 632, 581, 862.21, 862.22, 862.23; 81/429; 310/336

[56] References Cited

U.S. PATENT DOCUMENTS 3,810,385 5/1974 McFaul et al. ....................... 73/581
3,969,810 7/1976 Pagano ................................ 73/581
5,058,439 10/1991 Carpenter ............................ 73/581
5,112,248 5/1992 Kibblewhite et al. ............... 73/761

FOREIGN PATENT DOCUMENTS 1413242 3/1974 United Kingdom .................. 73/644

*Primary Examiner*—Robert Raevis
*Attorney, Agent, or Firm*—Sughrue, Mion, Zinn, Macpeak & Seas

[57] ABSTRACT

A screwing device has means for measuring the tightening strain in a bolt and is of the type in which a support arm housing transmission members supports a screwing head by means of a transmission shaft connected to the transmission members, the screwing head being movable relative to the support arm and housing means, which are fixed relative to the arm, for supporting the measuring means.

6 Claims, 1 Drawing Sheet

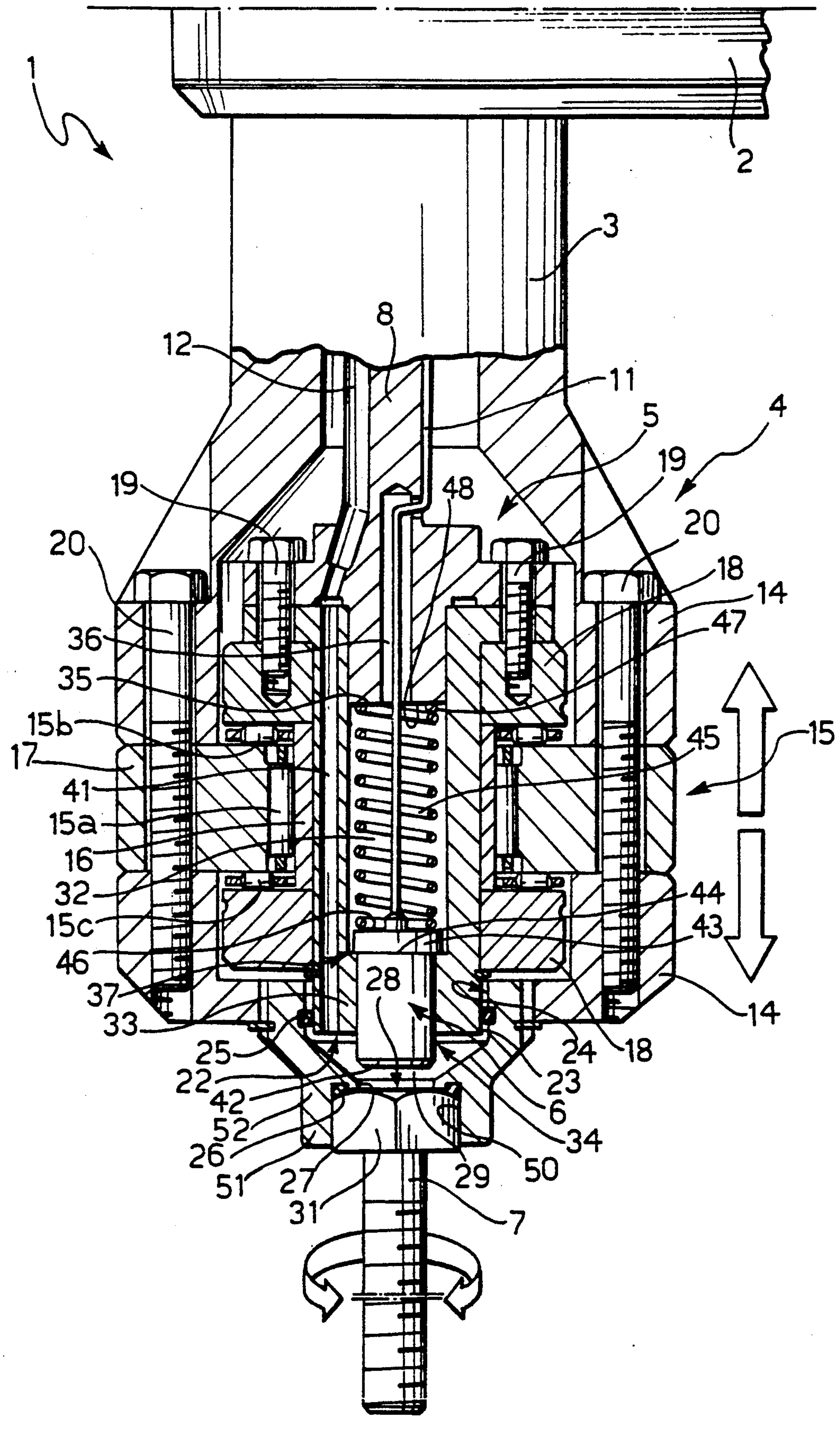
1
2
3
8
12
11
5
4
19
48
19
20
20
18
14
36
47
35
15b
45
15
17
41
15a
16
32
44
15c
43
46
28
37
14
33
24
18
25
23
22
42
6
52
34
26
50
51
27
29
31
7

SCREWING DEVICE WITH MEANS FOR MEASURING THE TIGHTENING STRAIN IN A BOLT

The present invention relates to a screwing device with means for measuring the tightening strain in a bolt.

BACKGROUND OF THE INVENTION

Various devices for tightening bolts and checking and measuring the tightening strain therein are currently known in the art and are constituted essentially by spanners for tightening the bolts and ultrasound devices for detecting the tightening strain.

The ultrasound device is constituted by an ultrasound emitter/receiver transducer in which resonance is set up at an ultrasonic frequency, for example, by a quartz crystal excited by a piezoelectric effect; in addition to the transducer, the ultrasound device includes a central unit for processing the signals exchanged with the transducer.

The tightening strain to which a bolt is subjected can easily be found by such a device, which can measure the length of a part or of a bolt provided it is made of homogeneous material, by virtue of the reflection of the elastic waves at the outer surfaces of the part or bolt.

In fact, it is known that, after the bolt has been placed with its head in abutment with the surface, it undergoes an extension proportional to the tightening strain to which is it subjected.

A first technique consists of the use of a spanner separate from the ultrasound device.

Once the bolt has been tightened until its head abuts the surface into which it is being screwed, its length is measured by the ultrasound device and stored as a reference length.

The bolt is then tightened into its seat by the spanner and its length is checked again by the ultrasound device.

The tightening strain in the bolt can easily be found by comparing the new measurement of its length with the reference measurement.

This technique of successive approximations enables a bolt to be tightened with a predetermined tightening strain.

Another currently known technique consists of the use of an automatic screwing device for tightening bolts and measuring the tightening strain, constituted by a screwing head containing an integral ultrasound transducer which can measure the extension of the bolt.

With the use of this latter device, the ultrasound transducer is placed practically in contact with the upper surface of the head of the bolt which is housed in a bush; to ensure an effective coupling between the transducer and the head of the bolt, a film of an ultrasound-permeable fluid, such as, for example, glycerine, grease or a heavy oil, is interposed between the two surfaces.

SUMMARY OF THE INVENTION

The screwing head, and hence also the transducer is rotated in order to tighten the bolt; throughout the screwing stage, the ultrasound transducer sends data regarding the length of the bolt to a central unit which can calculate the length of the bolt, and hence the tightening strain, on the basis of successive measurements.

Some types of such a device can also be used connected to a control unit .which can automatically stop the screwing as a result of the receipt of a signal, from the ultrasound transducer, that a predetermined tightening strain has been reached.

The known technical solutions described above are not without disadvantages, however; the first technique has the serious disadvantage that at least two measurements of the bolt have to be made, a first measurement to derive a reference value as soon as the head of the bolt abuts the surface into which it is screwed, and subsequent measurements after the bolt has been tightened by a suitable spanner to determine the extension of the bolt and hence the tightening strain; a predetermined tightening strain is thus achieved by successive approximations and a laborious and lengthy process.

The second technical solution described has the considerable advantage, over the first, that the tightening of the bolt and the measurement of its extension are carried out but simultaneously without the need to stop screwing; however, the fact that the ultrasound transducer rotates with the screwing head involves a problem in the transmission of the signals from the transducer to a central unit located outside the screwing head.

At the moment, the problem of transmitting the signals from the transducer, which rotates with the screwing head, to a fixed central unit is solved in a not entirely satisfactory manner with the use of sliding contacts or mercury contacts; in fact, the very low voltages, of the order of a few millivolts, generated by the transducer for transfer to the central unit are greatly upset by the voltage drops which occur in correspondence with the sliding contacts and which, moreover, are variable; the sliding contacts are also subject to frequent wear, necessitating maintenance of the entire screwing head.

The use of contacts immersed in mercury, however, involves the formation of contacts in sealed chambers and has been found hazardous because of the toxicity of mercury.

Moreover, because the upper surface of the head of the bolt is not perfectly flat, either due to imprecise finishing or sometimes due to the application of appropriate manufacturing and identification marks, the connection between the ultrasound transducer and the surface is not perfect, even when there is a film of ultrasound-permeable fluid between the transducer and the head of the bolt; this imperfect connection between the transducer and the head of the bolt often gives rise to malfunctioning and, in some cases, to faulty measurements of the length and of the tightening strain of the bolt.

The object of the invention is to provide a screwing device which has means for measuring the tightening strain in a bolt, which can tighten the bolt quickly with simultaneous measurement of the tightening strain therein, and in which the accuracy of the measurement is not affected by the condition of the finishing of the upper surface of the head of the bolt; the accuracy of the measurement of the tightening strain must also be independent of the method of construction and the components of the line for transmitting the signals between the transducer and the central unit.

This object is achieved by the invention, which relates to a screwing device with means for measuring the tightening strain in a bolt, of the type including a support arm housing transmission members and supporting a screwing head by means of a transmission shaft connected to the transmission members, the screwing head being movable relative to the support arm and housing means for supporting means for measuring the tightening strain on the bolt, characterized in that the means for supporting the measuring means consist of a support which is fixed relative to the arm, the transmission shaft being hollow and housing means for supporting and fixing the support, means for transmitting a signal between the measuring means and a central processing unit located outside the screwing device, and means for supplying an ultrasound-permeable fluid to the means for measuring the tightening strain.

BRIEF DESCRIPTION OF THE DRAWINGS

For a better understanding of the invention, a non-limiting description of an embodiment thereof will now be given with reference to the appended drawing which is a partial sectional view of a screwing device according to the invention.

DETAILED DESCRIPTION OF THE INVENTION

The device 1 includes a support arm 2 housing transmission members which are not shown in the drawing since their structure is known; the arm 2 supports, by means of a transmission shaft 3 connected to the transmission members, a screwing head 4 which is movable relative to the arm 2.

According to the invention, the screwing head 4 houses a fixed support 5 which in turn houses an ultrasound transducer 6, for example, of the type which operates by a piezoelectric effect, for measuring the length of a bolt 7.

The transmission shaft 3 is hollow and houses a rod 8 for supporting and fixing the support 5; a cable 11, for exchanging signals between the transducer 6 and a central processing unit of known type not shown in the drawing, and a flexible tube 12 for supplying an ultrasound-permeable fluid to the transducer 6 also extend through the shaft 3.

The support 5 is is joined to and centered on a rotary portion 14 of the head 4 by means of three rings of revolving bodies 15*a*, 15*b*, and 15*c*, of which the first is interposed between an inner ring 16 and an outer ring 17 and the other two are between the outer ring and two rings 18; the rings 16 and 18 are fixed to the support 5 and the ring 17 is fixed to the rotating portion 14.

The bolts 19 and 20 which fix the ring 18 to the support 5 and the ring 17 to the portion 14 can be seen ±n the drawing.

The revolving bodies 15*a* withstand radial loads and the revolving bodies 15*b* and 15*c* withstand axial loads.

There is a fluid-tight seal 25 between an outer side surface 23 of one end 22 of the support 5 and an inner side surface 24 of the movable portion 14 of the head 4; a second fluid-tight seal 26 is fitted between a shoulder 27 on the bottom of the movable portion 14 and an upper surface 28 of the head 31 of the bolt 7; thus, in use, a fluid-tight chamber 29 is created between the support 5, the transducer 6, the upper surface 28 of the bolt 7 and the inner wall 24 of the movable portion 14 of the screwing head 4 which can hold the fluid admitted through the tube 12 and an axial hole 41 in the support 5.

According to the invention, the support 5 has a substantially cylindrical cavity 32 for housing the transducer 6 in use; a first end 33 of the cavity 32 . faces the upper surface 28 of the bolt 7 and has a hole 34 through which the transducer 6 can project; the opposite end 35 of the cavity has a through-hole 36 through which the cable 11 can extend in use; the cavity 32 also has an internal shoulder 37.

The ultrasound transducer 6 is substantially cylindrical and is housed in the cavity 32; a first end 42 of the transducer 6, which faces the upper surface 28 of the head 31 of the bolt 7, projects from the support 5; the second, opposite end 43 of the transducer 6 has a shoulder 44 for cooperating in abutment with the shoulder 37 in the cavity 32 in use.

According to the invention, the transducer 6 is kept in abutment with the shoulder 37 of the cavity 32 by a spring 45, of which one end 46 is in contact with the transducer 6 and the opposite end 47 is in contact with an end surface 48 of the cavity 32.

Conveniently, as shown in the drawing, the fluid-tight chamber 29 and a shaped cavity 50 are formed in a bush 52 which is fixed to the outer portion 14 of the screwing head 4 by any convenient method.

In use, the bolt 7 is housed in the shaped cavity 50 in one end 51 of the screwing head 4, in contact with the seal 26; an ultrasound-permeable fluid is injected through the flexible tube 12 and the hole 41 into the chamber 29 which is completely and uniformly filled; the initial screwing stage, during which the movable portion 14 of the head 4 is rotated to screw the bolt 7 into its seat, not shown in the drawing, can then start.

During this stage, the transducer 6 measures the length of the bolt 7 both at rest and after its head 31 has come into abutment with a surface of its seat, not shown in the drawing.

Thus, the tightening strain in the bolt 7 can easily be found from its extension.

According to a structural variant not shown in the drawing, without departing from the scope of the invention, the screwing device 1 may be connected to a central processing unit which can store a predetermined tightening strain and can automatically stop the movable portion 14 of the head 4 from rotating when the predetermined tightening strain in the bolt 7 is reached.

The advantages of the invention are clear from the description; the presence of an ultrasound transducer within the screwing device enables the tightening strain in the bolt to be measured continuously and also enables interfacing with a system for stopping the device automatically when a predetermined tightening strain is reached; the fixed transducer also eliminates problems connected with the use of sliding or mercury contacts in relation to the transmission of the signal and to the maintenance of such contacts.

Moreover, the insertion of a uniform layer of ultrasound-permeable fluid between the fixed transducer and the head of the bolt eliminates the problems connected with the degree of surface finishing of the head of the bolt so that it is even possible to use bolts with different degrees of finishing or with identification marks stamped on the upper surfaces of their heads, without the need to flatten their surfaces before screwing.

What is claimed is:

1. A screwing device with means for measuring the tightening strain in a bolt, of the type including a support arm, transmission members housed in the support arm, a transmission shaft connected to the transmission members, a screwing head supported by the support arm by means of the transmission shaft, the screwing head being movable relative to the support arm, means for measuring the tightening strain in the bolt, and means housed in the screwing head for supporting the measuring means, wherein the means for supporting the measuring means consist of a support which is fixed relative to the support arm, and wherein the transmission shaft is hollow and houses means for supporting and fixing the support transmitting means for transmitting a signal between the measuring means and an external central processing unit, and supply means for supplying ultra-sound permeable fluid to the measuring means.

2. A screwing device according to claim 1, wherein the screwing head has a lower shoulder, first fluid-tight means between the lower shoulder and the upper surface of a bolt fitted in the head in use, and second fluid-tight means between an inner surface of the screwing head and a corresponding outer surface of the support, whereby a fluid-tight chamber for housing the ultrasound-permeable fluid in use is created between the screwing head, the measuring means, and the upper surface of the bolt.

3. A screwing device according to claim 2, wherein the fixed support has a substantially cylindrical cavity for housing the measuring means, the cavity having a first end which faces the upper surface of a bolt in use and has a hole through which the measuring means can project, and a second end opposite said first end and defining a through-hole for housing the transmitting means, said supply means comprising a through-hole in said support for the passage of the fluid beside the cavity, and respective revolving bodies are disposed between the support and the head for connecting the head to the support rotatably, in an axially fixed position.

4. A screwing device according to claim 3, wherein the measuring means are constituted essentially by a substantially cylindrical piezoelectric ultrasound transducer having a first end and a second, opposite end which faces the head of a bolt fitted in the screwing head in use, respective circular shoulders are formed at the second end of the transducer and in the cavity in the support and resilient means are housed in said cavity in engagement with said transducer for biasing said transducer toward the bolt, the shoulder of the transducer being housed in the cavity in the support and being kept in abutment with the shoulder in the cavity by the resilient means.

5. A screwing device to claim 1, wherein the supply means for supplying the ultrasound-permeable fluid are constituted by a flexible tube.

6. A screwing device according to claim 1, wherein the transmitting means for transmitting the signal are constituted essentially by a multicore cable.

* * * * *